(12) United States Patent
Kawalay et al.

(10) Patent No.: US 11,349,724 B2
(45) Date of Patent: May 31, 2022

(54) PREDICTIVE ANALYSIS IN A SOFTWARE DEFINED NETWORK

(71) Applicant: NICIRA, INC., Palo Alto, CA (US)

(72) Inventors: Ujwala Kawalay, Pune (IN); Prashant Ambardekar, Pune (IN); Prayas Gaurav, Pune (IN); Rajiv Krishnamurthy, Palo Alto, CA (US); Gurprit Johal, Pune (IN)

(73) Assignee: NICIRA, INC., Palo Alto, CA (US)

( * ) Notice: Subject to any disclaimer, the term of this patent is extended or adjusted under 35 U.S.C. 154(b) by 29 days.

(21) Appl. No.: 15/907,304

(22) Filed: Feb. 28, 2018

(65) Prior Publication Data

US 2019/0215246 A1     Jul. 11, 2019

(30) Foreign Application Priority Data

Jan. 5, 2018 (IN) .............................. 201841000647

(51) Int. Cl.
*H04L 41/147* (2022.01)
*H04L 41/22* (2022.01)

(52) U.S. Cl.
CPC ............ *H04L 41/147* (2013.01); *H04L 41/22* (2013.01)

(58) Field of Classification Search
CPC .............................. H04L 41/147; H04L 41/22
See application file for complete search history.

(56) References Cited

U.S. PATENT DOCUMENTS

| | | | | |
|---|---|---|---|---|
| 6,393,386 B1* | 5/2002 | Zager | ................ | H04L 41/0233 370/254 |
| 2008/0101352 A1* | 5/2008 | Barham | ............ | H04L 41/0645 370/389 |
| 2013/0290512 A1* | 10/2013 | Ngoo | ................ | H04L 41/147 709/224 |
| 2017/0134224 A1* | 5/2017 | Korkalo | ................ | H04L 41/22 |
| 2019/0036782 A1* | 1/2019 | Smith | ................ | H04L 41/0893 |

OTHER PUBLICATIONS

Brian Proffitt, "Software-Defined Networking (SDN): What It Is, How It Works, Why It Matters," Apr. 23, 2013. (Year: 2013).*
Townsend Security, "VMware Encryption 9 Critical Components of a Defensible Encryption Strategy", dated Mar. 28, 2015, 24 pages.

* cited by examiner

*Primary Examiner* — Andrew C Georgandellis (57) ABSTRACT

An approach for a software defined networking manager to perform a predictive analysis of proposed modifications to a software defined network (SDN) is presented. A method comprises receiving entity logical associations that are captured in a set of rules implemented in a SDN. Once a proposed modification to the entity logical associations is received, without implementing the proposed modification and without modifying the set of rules, impacted entity associations, from the entity logical associations, are identified. Upon receiving input indicating that the proposed modification is to be accepted, an updated set of rules for the SDN is generated by updating the set of rules based on the proposed modification, and the updated set of rules is implemented in the SDN.

20 Claims, 5 Drawing Sheets

402 Example Prediction

410 — If VM1 is added to Security Group1,
420 — then VM1 will lose connectivity to Subnet2,
430 — User1 will be impacted,
440 — User1 will be unable to use APP2.

450 Accept

455 Reject

FIG. 5

PREDICTIVE ANALYSIS IN A SOFTWARE DEFINED NETWORK

RELATED APPLICATIONS

Benefit is claimed under 35 U.S.C. 119(a)-(d) to Foreign Application Serial No. 201841000647 filed in India entitled "PREDICTIVE ANALYSIS IN A SOFTWARE DEFINED NETWORK", on Jan. 5, 2018, by NICIRA, INC., which is herein incorporated in its entirety by reference for all purposes.

BACKGROUND

A software defined network (SDN) may be configured by implementing rules and configurations defining the topology of the SDN overlay network. This may also include configuring network security policies for networking and non-networking assets such as workloads, virtual machines, resource pools, and the like.

A network configuration may be modified from-time-to-time, and the modifications may impact the security and usability of the network. For example, reconfiguring firewall rules or modifying associations between the rules and the tags of virtual machines may prevent some users from accessing some network resources.

Predicting the impact that a topology reconfiguration may have on the network is usually difficult. For example, predicting whether adding a new security group to a firewall rule would not impact the connectivity between some virtual machines in the network may be quite difficult, especially if the network implements hundreds or thousands of virtual machines.

SUMMARY

Techniques are described herein for performing a predictive analysis of proposed modifications to an SDN. In an embodiment, a method comprises receiving a plurality of entity logical associations that are captured in a set of rules implemented in the SDN. The entity logical associations represent logical relationships between entities, tags, firewall rules, encryption rules, and the like. For example, a logical association may represent a logical relationship between a virtual machine tag and a firewall rule, or a logical relationship between a security group tag and a distributed network encryption rule.

A set of rules and the corresponding entity logical associations may be used to generate a data model to represent the network topology. The model may be used to simulate the effects that proposed modifications to the topology may have on the logical associations and the rules. For example, upon receiving a proposed modification, the model may be executed to simulate a hypothetical implementation of the proposed modification within the model. This may include transforming the model from one state, in which the proposed modification has not yet been implemented, to another state, in which the proposed modification has been hypothetically implemented.

In an embodiment, upon receiving a proposed modification, a data model of the network is executed to simulate a hypothetical implementation of the proposed modification, and to predict whether the proposed modification could have any impact on the network connectivity and/or security. The prediction is generated without implementing the proposed modification in the network and without modifying the set of rules or the associations implemented in the network. The prediction may be generated by performing a predictive analysis of the data model as the model is subjected to the proposed modification. The prediction may provide information identifying entity associations that may be impacted if the proposed modification is implemented in the network. Such associations are referred to herein as impacted entity associations.

A prediction may be communicated to system administrators, network managers, and/or users. For example, the prediction may be displayed on display devices, or included in electronic mails (emails) transmitted to the administrators. Upon receiving a prediction, an administrator may decide whether the proposed modification is to be implemented or not. The administrator may communicate the decision to an SDN manager via a graphical user interface (GUI) by selecting a menu item, or a button, that is displayed in the GUI and corresponds to the decision. The decision may indicate that the proposed modification is to be accepted, or that the proposed modification is to be rejected. The decision is referred to herein as input.

Upon receiving a decision from an administrator, the SDN manager parses the decision to determine whether the proposed modification is to be accepted or rejected. If it is determined that the proposed modification is to be accepted, then an updated set of rules for the SDN is generated. The updated set of rules may be generated by updating the set of rules based on the proposed modification. This may include redefining some of the entity logical associations that were captured in the set of rules, and encoding the redefined associations in an updated set of rules.

However, if it is determined that the proposed modification is to be rejected, then the set of rules is not updated at this time. Instead, a message may be displayed on a display device to indicate that the proposed modification has been rejected. The message may be displayed in a GUI, and/or transmitted via emails to system administrators, managers, and/or users.

In an embodiment, an approach allows visualizing logical associations defined between the network and non-network entities and captured in a set of rules in the SDN. The logical associations may for example, capture the relationships between virtual machine tags and distributed network encryption (DNE) rules, or relationships between security group tags and firewall rules.

The process of generating a visualization of the logical associations may start with generating a digital representation of the logical associations. The digital representation may correspond to a data model that was described above. The digital representation of the logical entities may identify the relationships between networking and non-networking assets.

From a digital representation of the logical associations, a graphical representation of the logical association may be generated. The graphical representation may include graphical objects that correspond to the entities included in the logical associations. The graphical representation may also include links that correspond to the logical associations between the entities. For example, an association between a virtual machine tag and a firewall rule may be graphically represented using a tag object corresponding to the virtual machine tag, a firewall object corresponding to the firewall rule, and a link between the tag object and the firewall object that corresponds to the logical association between the virtual machine tag and the firewall rule. The graphical representation of the logical associations that is defined prior to proposing a modification to the SDN is referred to herein as an initial graphical representation.

In addition to generating an initial graphical representation, an overlay graphical representation may be generated. The overlay graphical representation depicts the logical associations that could be defined if a proposed modification was hypothetically implemented in the SDN. The process of generating an overlay graphical representation may start from generating an overlay digital representation.

An overlay digital representation is generated to capture logical associations between the network and non-network entities as if a proposed modification was hypothetically implemented in the network. The overlay digital representation may be captured in a data model that has been subjected to a simulation process using the proposed modification. The simulation may include executing the model by applying the proposed modification to the model.

From an overlay digital representation, an overlay graphical representation of the logical associations may be generated. The overlay graphical representation may include graphical objects that correspond to the entities included in the simulated logical associations. The overlay graphical representation may also include links that correspond to the simulated logical associations. For example, a simulated association between a virtual machine tag and a firewall rule may be graphically represented using a tag object corresponding to the virtual machine, a firewall object corresponding to the firewall rule, and a link that corresponds to a simulated association between the tag object and the firewall object.

An initial graphical representation and an overlay graphical representation may be displayed on a display device in many different ways. For example, the initial graphical representation and the overlay graphical representation may be displayed next to each other on a display screen of the display device. According to another example, the overlay graphical representation may be displayed as an overlay over the initial graphical representation. In this example, the entities that might be impacted if the proposed modification was hypothetically implemented may be color-coded differently in the overlay graphical representation than the entities in the initial graphical representation.

DETAILED DESCRIPTION

In the following description, for the purposes of explanation, numerous specific details are set forth in order to provide a thorough understanding of the presently described method. It will be apparent, however, that the present approach may be practiced without these specific details. In other instances, well-known structures and devices are shown in a block diagram form to avoid unnecessarily obscuring the present approach.

Example System Architecture for a Predictive Analysis

Figure 1:
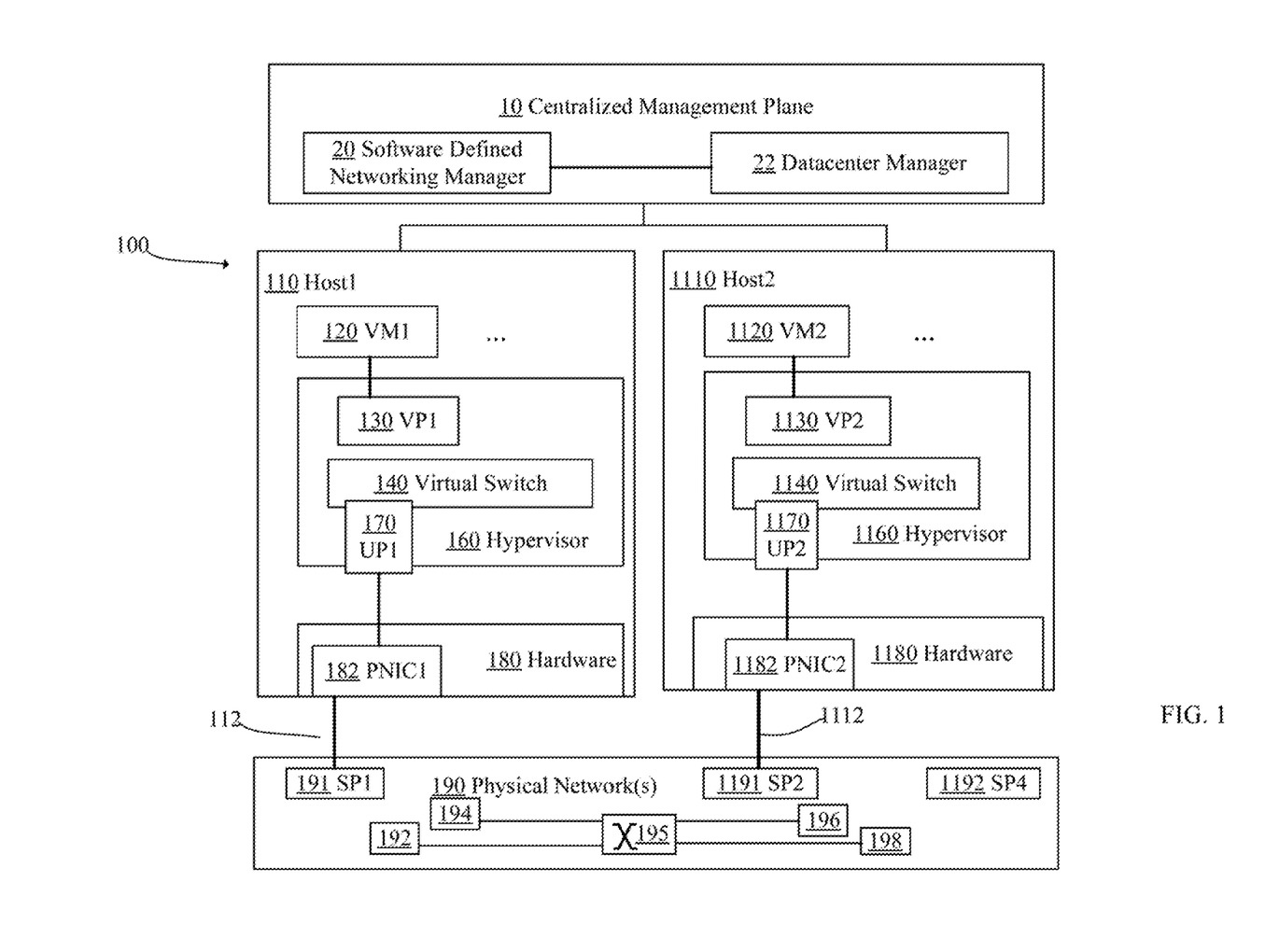
FIG. 1 is a block diagram depicting an example system architecture for a predictive analysis in a software defined network.

FIG. 1 is a block diagram depicting an example system architecture 100 for a predictive analysis in a SDN. In the depicted system, system architecture 100 includes a centralized management plane 10, two or more hosts 110, 1110, and one or more physical networks 190.

Centralized management plane 10 may include an SDN manager 20 and a datacenter manager 22. SDN manager 20 may be configured to distribute various rules and policies to management plane agents, and receive update information from the agents. Specifically, SDN 20 may be configured to perform a predictive analysis of effects that modifications proposed to the network topology may have on the network connectivity and security.

Datacenter manager 22 may be configured to collect information about events, actions and tasks occurring or executed in a datacenter, and communicate the collected information to SDN manager 20.

Host 110 may include a hypervisor 160, hardware components 180, and other components not depicted in FIG. 1. Hypervisor 160 may include a virtual switch 140, and may provide connectivity to and from one or more virtual machines. FIG. 1 depicts that host 110 hosts one virtual machine VM1 120. However, host 110 may host as many virtual machines as the configuration of the host allows for.

Host 1110 may include a hypervisor 1160, hardware components 1180, and other components not depicted in FIG. 1. Hypervisor 1160 may include a virtual switch 1140, and may provide connectivity to and from one or more virtual machines. FIG. 1 depicts that host 1110 hosts one virtual machine VM2 1120. However, host 1110 may host as many virtual machines as the configuration of the host allows for.

Hardware components 180/1180 may include hardware processors, memory units, data storage units, and physical network interfaces, some of which are not depicted in FIG. 1. Hardware components 180/1180 may also include physical network interface controllers, such as PNIC1 182, PNIC2 1182, which may provide connectivity to routers and switches of physical networks 190.

Hypervisors 160, 1160 use uplinks 170, 1170, respectively, to provide connectivity to and from PNICs 182, 1182, respectively. Hypervisor 160/1160 may be implemented as a software layer that supports execution of multiple virtualized computing instances of virtual machines.

Virtual switch 140/1140 may be configured to monitor and manage data traffic that is communicated to and from hypervisor 160/1160, respectively. Virtual switch 140/1140 may be implemented as a kernel component of hypervisor 160/1160, respectively, or as an entity that is separate from hypervisor 160/1160, but that communicates with hypervisor 160/1160.

Implementations of virtual switch 140/1140 may vary and may depend on a type of product in which the switch is deployed as a virtualization medium. For example, virtual switch 140/1160 may be implemented as part of hypervisor 160/1160, as it is depicted in FIG. 1, and as it is in the vSphere® and KVM® lines of products. Alternatively, although not depicted in FIG. 1, a virtual switch may be implemented as a hardware component, or as part of a user space, or within a privileged virtual machine. Examples of such implementations include the Hyper-V® and Xen® lines of products.

Virtual machines, including VMs 120/1120, may be realized as complete computational environments. The virtual machines contain virtual equivalents of hardware and software components of the physical computing systems. Virtual machines may be instantiated as virtualized computing instances. The instances may be equipped with their own resources, may be assigned their own workloads, and may be configured to perform their own tasks assigned to the workloads. Virtual resources allocated to the virtual machines may include virtual CPUs, virtual memory, virtual disks, virtual network interface controllers and the like. The virtual machines may be configured to execute guest operating systems and guest applications.

A virtualized computing instance may be realized as a hardware virtualization and/or a software virtualization. As a hardware virtualization, the instance may represent for example, an addressable virtual machine. As a software virtualization, the instance may be used to provide for example, an isolated user space instance. Virtualized computing instances may include containers running on a top of host operating systems, virtual private servers, client computers, and hybrid combinations of thereof.

Physical networks 190 may include local area networks and/or wide area networks, and may utilize various hardware and software configurations. For example, physical networks 190 may include one or more routers 192, 194, 196, 198, one or more switches 195, and one or more switch ports 191, 1191. Physical networks 190 may also include other components that are not depicted in FIG. 1.

Generating Graphical Representations of Logical Associations

Figure 2:
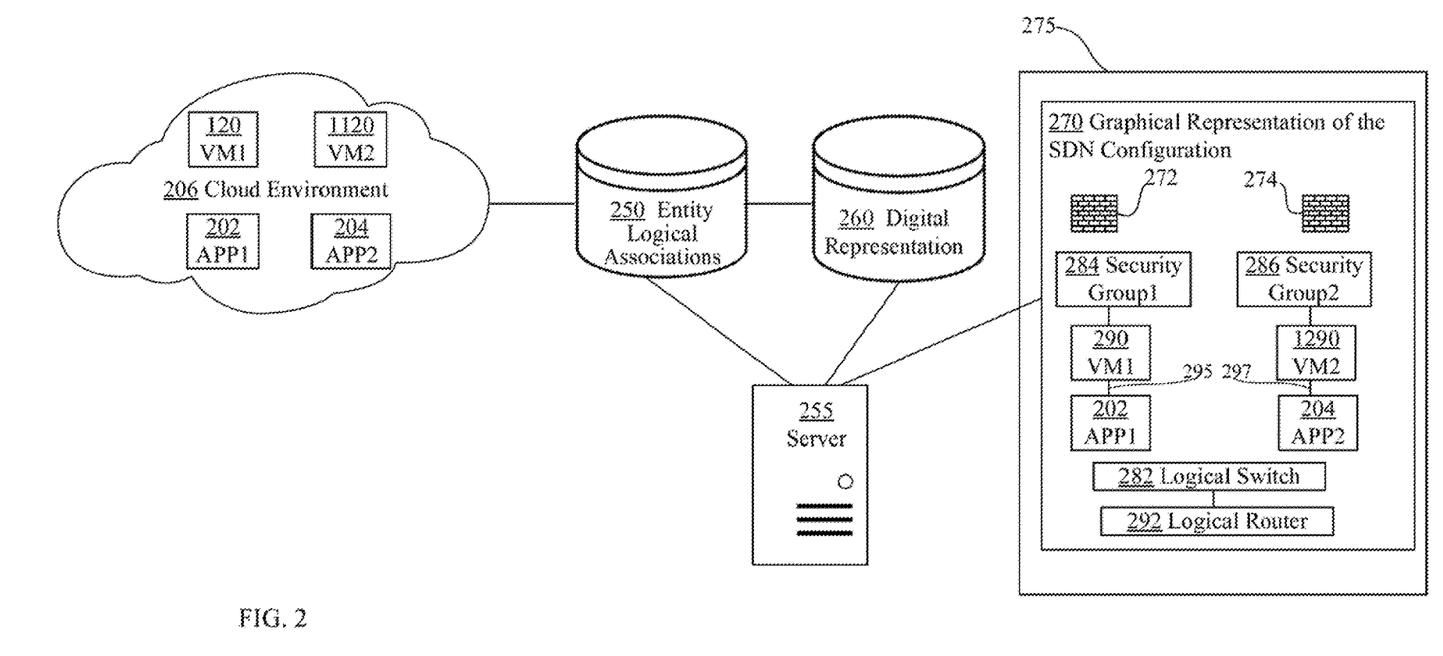
FIG. 2 is a block diagram depicting an example process for generating a graphical representation of logical associations.

FIG. 2 is a block diagram depicting an example process for generating a graphical representation of logical associations. The depicted example shows a cloud environment 206, a storage device storing entity logical associations 250, a storage device storing a digital representation 260, a display device 275 displaying a graphical representation 270 of the SDN configuration, and a server 255.

Cloud environment 206 comprises an SDN that implements various components of the virtual network. The virtual network may include hosts, virtual machines, virtual switches, virtual ports, and the like. The virtual machines may execute various applications. Merely to describe a clear example, cloud environment 206 depicted in FIG. 2 includes virtual machines VM1 120 and VM2 1120, and applications APP1 202 and APP2 204. However, cloud environment 206 may include additional virtual components that are not depicted in FIG. 2.

Cloud 206 may store information about the entities and rules implemented in an SDN in a configuration data structure maintained in for example, a centralized management plane. The data structures may be searchable and modifiable. For example, the data structures may be searched for the information about the entity logical associations 250. The associations may represent logical relationships between for example, virtual machine tags and firewall rules.

Server 255 may be implemented as part of an SDN manager of a centralized management plane. Server 255 may be configured to search entity logical associations 250 stored in a storage device, perform a fast retrieval of entity logical associations 250 from the storage, modify some of the entity associations, and/or store the modified entity associations in the storage device.

Server 255 may also retrieve entity logical associations 250 from the storage device, use the retrieved information to generate digital representation 260 of entity logical associations 250, and store digital representation 260 in the storage device. Server 255 may use information about digital representation 260 to generate graphical representation 270 of the SDN configuration, and display graphical representation 270 on display device 275.

Graphical representation 270 may include graphical objects. The graphical objects may correspond to the logical entities identified in digital representation 260. The logical entities may correspond to firewall rules, such as rules 272, 274; security group tags, such as tags 284, 286; virtual machines tags, such as tags 290, 1290; application tags, such as tags 202, 204, logical switch tags, such as a tag 282; logical router tags, such as a tag 292, and the like.

Graphical representation 270 may also include links. The links may correspond to the entity logical associations defined by the rules implemented in the network. In the example depicted in FIG. 2, a link 295 corresponds to a logical association between virtual machine tag 290 and an application tag 202, while a link 297 corresponds to a logical association between virtual machine tag 1290 and an application tag 204. Therefore, a virtual machine tagged with tag 290 may serve the application tagged with tag 202, while a virtual machine tagged with tag 1290 may serve the application tagged with tag 204. By corollary, the users in a security group 1 cannot access the application tagged with tag 204, while the users in a security group 2 cannot access the application tagged with tag 202.

Generating Predictions

Server 255 may use information about entity logical associations 250 to generate a data model of the associations implemented in the SDN. Server 255 may perform a simulation using the data model and a proposed modification to determine whether the proposed modification, if implemented in the SDN, could impact the network security and/or connectivity. The simulation of the data model using the proposed modification may result in deriving a prediction indicating whether the proposed modification could impact the network security and/or connectivity. The prediction may indicate for example, that if a particular virtual machine is added to a particular security group and associated with a particular firewall rule, then a user may not be able to launch a particular application from the particular virtual machine. An example of predictions is described in FIG. 3.

A prediction may be displayed, or otherwise communicated to users, to provide the users with an indication of what could happen if the proposed modification was implemented. After displaying the prediction on display device 275, server 255 may await receiving input from a user indicating whether to accept, or reject, the proposed modification. Upon receiving the input, server 255 may parse the input to determine whether the proposed modification is to be accepted or rejected.

If it is determined that the proposed modification is to be accepted, then server 255 implements the proposed modification in the SDN. This may involve modifying the set of rules defining the entity logical associations and modifying the corresponding entity logical associations. The modified entity associations may be used to replace entity logical associations 250 stored in the storage device.

However, if it is determined that the proposed modification is not to be accepted, then server 255 does not implement the proposed modification in the SDN. Instead, server 255 may display on display device 275, or otherwise communicate to users, a message that the proposed modification has been rejected, and that the SDN is not going to be reconfigured at this time.

Simulating a Change in a Network Configuration

Figure 3:
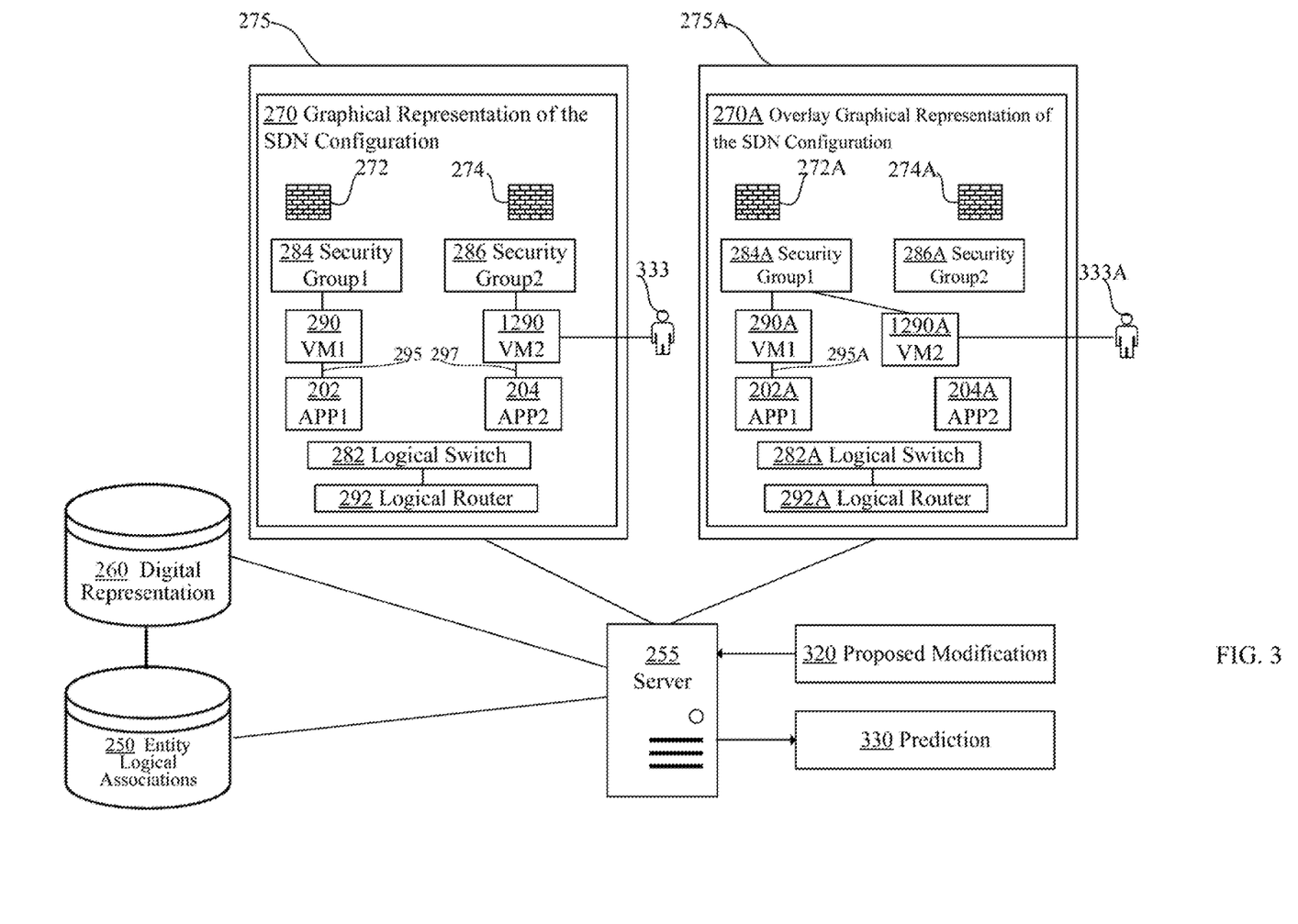
FIG. 3 depicts an example approach for simulating a change in a network configuration to determine the impact that the change could have on security and usability of the network.

FIG. 3 depicts an example approach for simulating a change in a network configuration to determine the impact that the change could have on security and usability of the network. In the depicted example, server 255 retrieves entity logical associations 250, and uses them to generate a data model of the logical associations implemented in the network topology. The data model may capture the entity logical associations defined by the rules implemented in the network, and may correspond to digital representation 260.

Server 255 may use information about digital representation 260 to generate graphical representation 270 of the SDN configuration, and display graphical representation 270 on display device 275.

Graphical representation 270 may include graphical objects. The graphical representation of the objects may vary from one implementation to another. Example objects are depicted in FIG. 2. The examples described in FIG. 2 are provided to illustrate a clear example, not to exhaust all possible implementations of the graphical representations.

The graphical objects may correspond to the logical entities identified in digital representation 260. The logical entities may correspond to firewall rules, such as rules 272, 274; security group tags, such as tags 284, 286; virtual machines tags, such as tags 290, 1290; application tags, such as tags 202, 204, logical switch tags, such as a tag 282; logical router tags, such as a tag 292, and the like.

Graphical representation 270 may also include links. The links may correspond to the entity logical associations defined by the rules implemented in the network. In the example depicted in FIG. 2, a link 295 corresponds to a logical association between virtual machine tag 290 and an application tag 202, while a link 297 corresponds to a logical association between virtual machine tag 1290 and an application tag 204.

Generating Predictions

Server 255 may use the information about entity logical associations 250 to generate a data model of the associations implemented in the SDN. Server 255 may perform a simulation using the data model and a proposed modification 320 to determine whether proposed modification 320, if implemented in the SDN, could impact the network security and/or connectivity.

The simulation of the data model using proposed modification 320 may result in deriving a prediction 330 indicating whether the proposed modification could impact the network security and/or connectivity. The prediction may indicate for example, that if a particular virtual machine is added to a particular security group and associated with a particular firewall rule, then a user may not be able to launch a particular application from the particular virtual machine. An example of predictions is described in FIG. 4.

A prediction may be displayed, or otherwise communicated to users, to provide the users with an indication of what could happen if proposed modification 320 was implemented. After displaying the prediction on display device 275, server 255 may await receiving input from a user. The input may indicate whether to accept or reject proposed modification 320. Upon receiving the input, server 255 may parse the input to determine whether proposed modification 320 is to be accepted or rejected.

If it is determined that proposed modification 320 is to be accepted, then server 255 implements proposed modification 320 in the SDN. This may involve modifying the set of rules defining the entity logical associations and modifying the corresponding entity logical associations. The modified entity associations may be used to replace entity logical associations 250 stored in the storage device.

However, if it is determined that proposed modification 320 is to be rejected, then server 255 does not implement proposed modification 320 in the SDN. Instead, server 255 may display on display device 275, or otherwise communicate to a user, a message that proposed modification 320 has been rejected, and that the SDN is not going to be reconfigured at this time.

Simulating a Change in a Network Configuration

In the example depicted in FIG. 3, server 255 retrieves entity logical associations 250, and uses them to generate a data model of the logical associations that implement the network topology. The data model may capture the entity logical associations defined by the rules implemented in the network, and may correspond to digital representation 260.

Server 255 may use the information about digital representation 260 to generate graphical representation 270. Graphical representation 270 may be displayed on display device 275. Graphical representation 270 is described in FIG. 2.

In the example depicted in FIG. 3, link 295 corresponds to a logical association between virtual machine tag 290 and application tag 202, while link 297 corresponds to a logical association between virtual machine tag 1290 and application tag 204. Therefore, a virtual machine tagged with tag 290 may serve the application tagged with tag 202, while a virtual machine tagged with tag 1290 may serve the application tagged with tag 204. As depicted in FIG. 3, a user 333 executes virtual machine VM2 tagged with tag 1290, and accesses an application tagged with tag 204.

Upon receiving proposed modification 320, server 255 simulates the proposed modification on the data model of the associations and rules implemented in the SDN. Simulating the proposed modification on the data model includes simulating, in the data model, the changes included in proposed modification 320 to determine whether proposed modification 320 could have any impact on the associations and rules in the network. Upon completing the simulation, server 255 may generate an overlay graphical representation 270A of the SDN configuration, and display overlay graphical representation 270A on a display device 275A, as depicted in FIG. 3.

Overlay graphical representation 270A may include various object and links. The objects may correspond to the logical entities that would be defined if proposed modification 320 was hypothetically implemented in the network. The logical entities may correspond to firewall rules, such as rules 272A, 274A; security group tags, such as tags 284A, 286A; virtual machines tags, such as tags 290A, 1290A; application tags, such as tags 202A, 204A, logical switch tags, such as a tag 282A; logical router tags, such as a tag 292A, and the like.

Overlay graphical representation 270A may also include links. The links may correspond to the entity logical associations that would be defined if proposed modification 320 was hypothetically implemented in the network. In the example depicted in FIG. 3, a link 295A corresponds to a logical association between virtual machine tag 290A and application tag 202A. Therefore, a virtual machine tagged with tag 290A may serve the application tagged with tag 202A. However, it should be also noted that a virtual machine tagged with tag 1290A may not serve the application tagged with tag 204A. As depicted in FIG. 3, a user 333A executes a virtual machine VM2 1290A, which is now associated with a security group 1, and therefore, user 333A cannot access an application tagged with tag 204A. Thus, implementing proposed modification 320 may deprive user 333A from accessing the application tagged with tag 204A.

Upon completing the simulation, server 255 generates prediction 330. Prediction 330 may include information indicating whether implementing proposed modification 320 in the SDN could potentially have an impact on the network security and connectivity. Prediction 330 may be displayed on display device 275A or emailed to a system administrator. Based on the prediction, the administrator may determine whether to pursue the proposed modification. In reaching the decision, the system administrator may also compare overlay graphical representation 270A to graphical representation 270 to determine the impact that implementing proposed modification 320 may have on the SDN.

For example, if a system administrator is planning on implementing a particular firewall rule, then by simulating the impact that the implementing of the particular firewall rule may have on the network, server 255 may generate overlay graphical representation 270A of the scope of the firewall rule. The system may overlay the overlay graphical representation over graphical representation 270, and present a resulting image to the system administrator. The system administrator may analyze the resulting image and determine whether implementing the particular firewall rule may potentially disconnect a particular subnet from a particular gateway, and if it does, then whether any user groups might lose access to the Internet, the applications, and/or other virtual machines.

Example Predictions

Predictions may include explanations of consequences that the topology reconfiguration may have on users. For example, if the topology reconfiguration includes adding a particular virtual machine to a particular security group, a particular firewall rule and a particular DNE rule, then a prediction may provide an explanation that the virtual machine may lose connectivity to a particular subnet. Furthermore, the prediction may provide an explanation that if the particular virtual machine loses the connectivity to the particular subnet, then a particular user, or users, who are using the particular virtual machine, may be directly impacted by the reconfiguration. Based on the received prediction, the system administrator may determine whether the reconfiguration is desirable as-is, or whether the reconfiguration needs to be revised before it can be implemented in the network.

Figure 4:
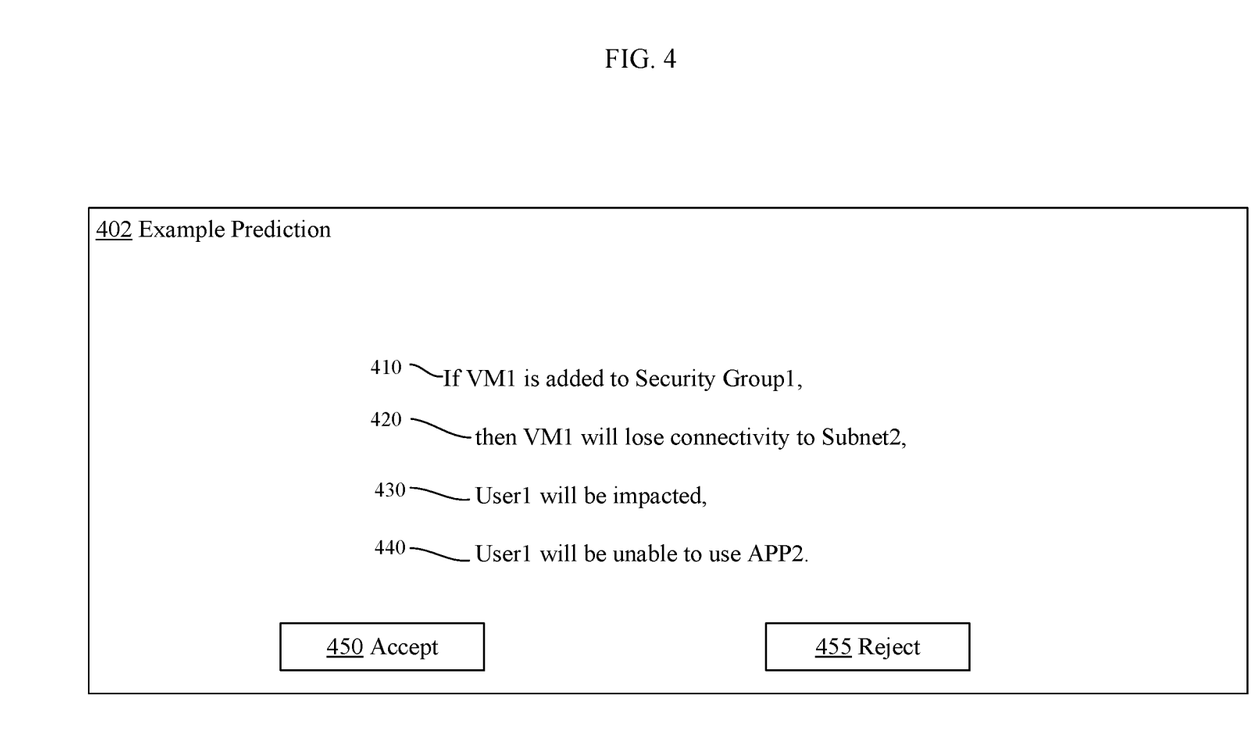
FIG. 4 depicts an example prediction obtained by simulating a change in a network configuration.

FIG. 4 depicts an example prediction 402 obtained by simulating a change in a network configuration. The example is provided merely to explain a clear prediction example, not to exhaust all possible predictions. In the depicted example, prediction 402 includes a proposed modification clause 410 and several prediction clauses 420, 430, 440. Proposed modification clause 410 states a proposed modification: if a virtual machine VM1 is added to a security group 1. The prediction clauses provide information about the impact that the proposed modification could have on the network. Specifically, if a virtual machine VM1 is added to a security group 1, then the virtual machine VM1 will lose connectivity to a subnet 2 (a prediction clause 420), a user 1 will be impacted (a prediction clause 430), and the user 1 will be unable to use an application 2 (a prediction clause 440).

In an embodiment, example prediction 402 includes an accept button 450 and/or a reject button 455. Accept button 450 and reject button 455 may be implemented as objects displayed on a display screen of a computer device and may be configured to receive input from a user. The user's input may indicate that the user either wishes to accept or reject the proposed reconfiguration. For example, using a pointing device, such as a mouse, a cursor or the user's finger, the user may either select accept button 450 to indicate that the proposed reconfiguration is to be accepted, or select rejection button 455 to indicate that the proposed reconfiguration is to be rejected. If accept button 450 is selected, then the proposed reconfiguration is implemented by sending the reconfiguration parameter values to the SDN control plane. However, if the reject button 455 is selected, then the proposed reconfiguration is rejected and the reconfiguration parameter values are not communicated to the control plane.

Example Flow Chart for a Predictive Analysis

Figure 5:
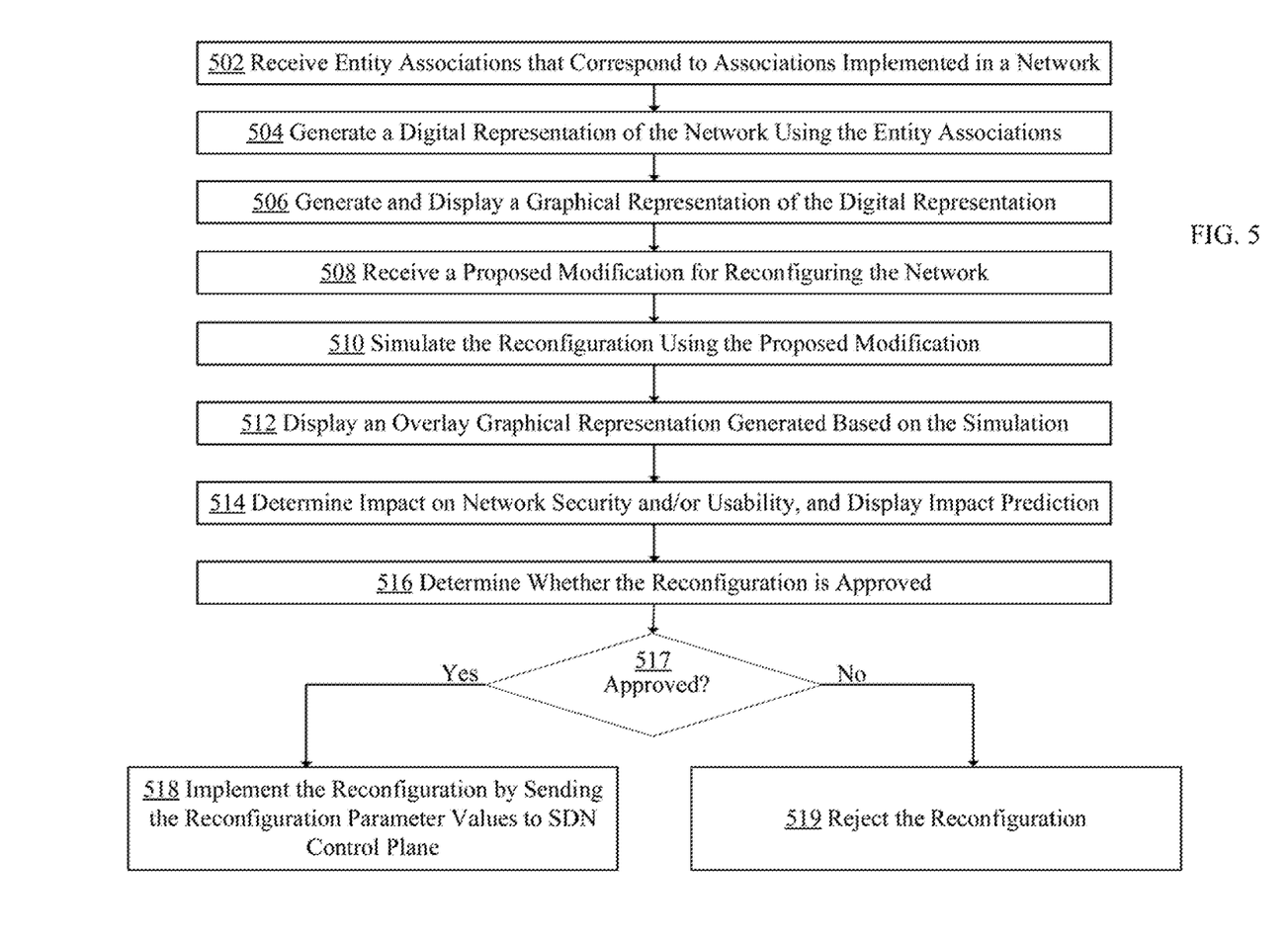
FIG. 5 depicts an example flow chart for simulating a change in a network configuration to determine the impact that the change could have on security and usability of the network.

FIG. 5 depicts an example flow chart for simulating a change in a network configuration to determine the impact that the change could have on security and usability of the network. In step 502, one or more entity associations are received. The entity associations may correspond to the associations implemented in the network, and may be derived from a configuration data structure generated and maintained for the network. The entity associations may correspond to for example, associations between security group tags, virtual machine tags, application tags, rule tags, and so forth.

In step 504, based on the received entity associations, a digital representation of the network is generated. The digital representation may include objects that correspond to the elements defined in the entity associations, and one or more connectors that connect the objects to form a topology of the network. The objects that correspond to the entities defined in the entity associations may be color-coded, or pattern-coded, and the relationships between the objects may be determined based on the color-coding, or the pattern-coding.

In step 506, a graphical representation of the digital representation of the network is generated. The graphical representation may graphically represent the objects and connectors that are defined in the digital representation of the network. The graphical representation may be generated using the functionalities of Java™, OpenGL™, and the like. Examples of the graphical representations of the network configurations are described in FIG. 2-3 (element 270), and FIG. 3 (elements 270 and 270A).

Also in this step, the graphical representation of the digital representation of the network may be displayed on a display device. The display device may be communicatively coupled to an operator console, an administrator workstation, a laptop, a smart device, and/or any other computer device.

In step 508, a proposed modification is received for reconfiguring the network. The proposed modification may encode the changes to the values of the configuration parameters included in a configuration data structure maintained for the network. The proposed modification may pertain to for example, reassigning one or more virtual machine tags from one security group to another security group, or reassigning one or more virtual machine tags from one logical switch to another logical switch.

In step 510, the proposed modification is used to simulate the reconfiguration. However, the simulation of the reconfiguration is not performed on the actual configuration parameters of the configuration file of the network. Instead, the simulation may be performed on a data model, or a network configuration model, generated for the network. The simulation is intended to emulate the operation of the reconfiguration, but without actually reconfiguring the network. The process of reconfiguring the network is intended to determine whether the hypothetical reconfiguration of the network based on the proposed modification could have caused any problems or issues in terms of providing services to the users. For example, the simulation may be performed to determine whether the reconfiguration could cause the users to lose access to certain resources or lose the ability to launch certain applications, and so forth.

In step 512, an overlay graphical representation of the simulated reconfiguration of the network is generated and displayed on a display device. An example of the overlay graphical representation is described in FIG. 3.

Also in this step, the overlay graphical representation is displayed on a display device. The overlay graphical representation may be displayed next to the graphical representation described in step 506. Alternatively, the overlay graphical representation may be displayed as an overlay on the top of the graphical representation.

Typically, both the graphical representation of the configuration and the overlay graphical representation are displayed on the same display device. If the display device has limited display capabilities, then the overlay graphical representation may be superimposed on the previously generated graphical representation, and the differences may be highlighted or depicted using pulsing lines to draw a viewer's attention to the changes.

In step 514, impact on the network security and/or usability is determined. That may be performed by identifying differences between the graphical representation depicting the state of the network before the hypothetical reconfiguration and the overlay graphical representation depicting the state of the network after the hypothetical reconfiguration. The differences may be classified or organized into groups, and based on the count of differences in groups having the highest priority, the impact of the hypothetical reconfiguration on the network security and/or usability may be determined.

In an embodiment, the impact description may be displayed on the display device. The impact description may be displayed as a prediction. An example of the prediction is described in FIG. 4. The prediction may indicate that the reconfiguration of the network based on the proposed modification will, or could, impact the security and/or usability of the network. The prediction may provide additional information indicating the services and the users that may be impacted. An example of a prediction is described in FIG. 4.

The prediction may also indicate whether the impact would be negative or positive. If the impact is negative, then the prediction may indicate the applications that certain users may be unable to use if the hypothetical reconfiguration is implemented. If the impact is positive, then the prediction may include an indication that certain users may gain access to certain applications or resources if the reconfiguration is implemented. If the impact is positive, then the prediction may also include an indication that communications exchanged between certain users may become protected.

In addition to displaying the prediction on a display device, an accept button and a reject button may also be displayed. Examples of the accept button and the reject button are an accept button 450 and reject button 455, respectively, described in FIG. 4. The buttons may be implemented as objects displayed on a display screen of a computer device, and may be configured to receive input from a user. The user's input may indicate that the user wishes to either accept or reject the proposed reconfiguration. The input may be provided using a pointing device, such as a mouse, a cursor or the user's finger. By selecting the accept button, the user indicates that the proposed reconfiguration is to be implemented. By selecting the reject button, the user indicates that the proposed reconfiguration is to be rejected.

In step 516, a test is performed to determine whether the reconfiguration was approved. The test may include determining whether the user selected an accept button or a reject button. Receiving the selection of the accept button indicates that the user approved the reconfiguration. Receiving the selection of the reject button indicates that the user rejected the hypothetical reconfiguration.

If it is determined, in step 517, that the user approved the reconfiguration, then step 518 is performed. Otherwise, step 519 is performed.

In step 518, the reconfiguration is implemented by sending the reconfiguration parameter values to the SDN control plane. This in turn may cause the control plane to set the system configuration parameters to the reconfiguration parameter values, and updating the configuration variables. In addition, a message may be displayed for the user to indicate that the hypothetical reconfiguration is being implemented.

However, if it is determined that the hypothetical reconfiguration is to be rejected, then the parameter values for the proposed reconfiguration are not communicated to the control plane. In addition, a message may be displayed for the user to indicate that the hypothetical reconfiguration has been rejected.

Improvements Provided by the Described Embodiments

In an embodiment, an approach presented herein allows system administrators to perform a "what-if-analysis" to determine the impact that modifying a network configuration may have on the network connectivity and security. The approach allows simulating a reconfiguration of the network topology without actually implementing the reconfiguration in the network. Upon receiving a proposed modification, a simulation of the network reconfiguration is initiated and a prediction is generated to indicate whether the proposed modification would impact any entities, or any associations, if the proposed modification was actually implemented.

A simulation process includes a simulation of the effects of the topology reconfiguration without actually applying the reconfiguration parameter values to the existing topology. The simulation includes retrieving existing entity associations established in the network, generating a digital model based on the entity associations, and applying the proposed modification to the digital model to simulate the effect of the proposed modification. The results of the simulation may provide system administrators with predictions of the effects that the proposed modification may cause.

In an embodiment, a system presented herein allows overlaying a depiction of graphical representation of a hypothetically reconfigured SDN on a top on a depiction of the current topology of the SDN. For example, upon selecting a simulation mode and receiving a proposed modification, a system administrator may request generating an overlay depiction of a firewall configuration as if the proposed modification was implemented, and request that the generated overlay depiction be overlaid over a graphical representation of the current topology of the network. Once the overlay depiction is overlaid over the graphical representation of the topology, the system administrator may assess the impact that modified firewall configuration may have on the network as a whole, and on the individual machines and processes in particular.

Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the contemplated uses.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for a software defined networking manager to perform a predictive analysis of proposed modifications to a software defined network prior to implementing the proposed modifications, the method comprising:

receiving a first plurality of logical associations for a first set of members of a first security group in a software defined network (SDN) and a second plurality of logical associations for a second set of members of a second security group in the SDN, the first security group governed by a first set of firewall rules and the second security group governed by a second set of firewall rules, wherein logical associations represent access between members in the SDN;

receiving a proposed modification, the proposed modification comprising a configuration modification causing a first member to be moved from the first security group to the second security group;

without implementing the proposed modification and without modifying the first set of firewall rules and the second set of firewall rules:

based on the second set of firewall rules, identifying new logical associations between the first member and one or more members of the second set of members in the second security group; and displaying, on a display device, a representation of the SDN with the new logical associations;

receiving input indicating whether to accept the proposed modification or to reject the proposed modification; and in response to determining that the input indicates that the proposed modification is to be accepted, implementing the proposed modification.

2. The method of claim 1, further comprising: based on, at least in part, the first set of firewall rules and the second set of firewall rules, generating a graphical representation of the plurality of logical associations;

displaying, on the display device, the graphical representation of the plurality of logical associations;

wherein the graphical representation includes a plurality of graphical objects that corresponds to a members included in the plurality of logical associations; and wherein the graphical representation includes a plurality of links that corresponds to the plurality of logical associations.

3. The method of claim 2, further comprising:

generating an overlay graphical representation of the new logical associations;

displaying, on the display device, an overlay graphical representation of the new logical associations;

wherein the overlay graphical representation includes a plurality of overlay graphical objects that corresponds to the first member and the one or more members of the second set of members; and wherein the overlay graphical representation includes one or more overlay links that corresponds to the first member and the one or more members of the second set of members.

4. The method of claim 3, wherein the overlay graphical representation of the first member and the one or more members of the second set of members is displayed on the display device as an overlay over the graphical representation of the plurality of logical associations.

5. The method of claim 1, wherein the first member did not have a logical association with the one or more members of the second set of members in the received plurality of entity logical associations.

6. The method of claim 1, wherein the first member is a virtual machine.

7. The method of claim 1, wherein identifying new logical associations between the first member and one or more members of the second set of members in the second security group is performed upon receiving a selection of a simulation mode;

wherein the selection of the simulation mode comprises:
generating a data model based on the set of rules implemented in the SDN;
generating a modified data model by modifying the data model using the proposed modification; and
without implementing the proposed modification and without modifying the first set of firewall rules and the second set of firewall rules, executing the modified data model to identify the first member and the one or more members of the second set of members if the proposed modification was implemented in the SDN.

8. One or more non-transitory computer-readable storage media storing one or more computer instructions which, when executed by one or more processors, cause the one or more processors to perform:

receiving a first plurality of logical associations for a first set of members of a first security group in a software defined network (SDN) and a second plurality of logical associations for a second set of members of a second security group in the SDN, the first security group governed by a first set of firewall rules and the second security group governed by a second set of firewall rules, wherein logical associations represent access between members in the SDN;

receiving a proposed modification, the proposed modification comprising a configuration modification causing a first member to be moved from the first security group to the second security group;

without implementing the proposed modification and without modifying the first set of firewall rules and the second set of firewall rules:
based on the second set of firewall rules, identifying new logical associations between the first member and one or more members of the second set of members in the second security group; and
displaying, on a display device, a representation of the SDN with the new logical associations;

receiving input indicating whether to accept the proposed modification or to reject the proposed modification; and in response to determining that the input indicates that the proposed modification is to be accepted, implementing the proposed modification.

9. The one or more non-transitory computer-readable storage media of claim 8, storing additional instructions which, when executed by the one or more processors, cause the one or more processors to perform:

based on, at least in part, the first set of firewall rules and the second set of firewall rules, generating a graphical representation of the first plurality of logical associations and the second plurality of logical associations;

displaying, on the display device, the graphical representation of the first plurality of logical associations and the second plurality of logical associations;

wherein the graphical representation includes a plurality of graphical objects that corresponds to the first set of members and the second set of members; and wherein the graphical representation includes a plurality of links that corresponds to the first plurality of logical associations and the second plurality of logical associations.

10. The one or more non-transitory computer-readable storage media of claim 9, storing additional instructions which, when executed by the one or more processors, cause the one or more processors to perform:

generating an overlay graphical representation of one or more impacted logical associations;

displaying, on the display device, the overlay graphical representation of the one or more impacted logical associations;

wherein the overlay graphical representation includes a plurality of overlay graphical objects that corresponds to the first member and one or more members of the second set of members; and wherein the overlay graphical representation includes one or more overlay links that corresponds to the one or more impacted logical associations.

11. The one or more non-transitory computer-readable storage media of claim 10, wherein the overlay graphical representation of the the first member and one or more members of the second set of members is displayed on the display device as an overlay over the graphical representation of the first set of members and the second set of members.

12. The one or more non-transitory computer-readable storage media of claim 8, further comprising:
   determining whether the input indicates that the proposed modification is to be rejected; and
   in response to determining that the input indicates that the proposed modification is to be rejected:
      displaying, on the display device, that the proposed modification has been rejected.

13. The one or more non-transitory computer-readable storage media of claim 8, wherein the first member is an application.

14. The one or more non-transitory computer-readable storage media of claim 8, wherein identifying the first member and the one or more members of the second set of members is performed upon receiving a selection of a simulation mode;
   wherein the selection of the simulation mode comprises:
      generating a data model based on the first set of firewall rules and the second set of firewall rules implemented in the SDN;
      generating a modified data model by modifying the data model using the proposed modification; and
      without implementing the proposed modification and without modifying the first set of firewall rules and the second set of firewall rules, executing the modified data model to identify the first member and the one or more members of the second set of members that would have been impacted if the proposed modification was implemented in the SDN.

15. A software defined network manager configured to perform a predictive analysis of proposed modifications to a software defined network prior to implementing the proposed modifications, the software defined network manager comprising:
   one or more processors;
   one or more memory units; and
   one or more non-transitory computer-readable storage media storing one or more computer instructions which, when executed by the one or more processors, cause the one or more processors to perform:
      receiving a first plurality of logical associations for a first set of members of a first security group in a software defined network (SDN) and a second plurality of logical associations for a second set of members of a second security group in the SDN, the first security group governed by a first set of firewall rules and the second security group governed by a second set of firewall rules, wherein logical associations represent access between members in the SDN;
      receiving a proposed modification, the proposed modification comprising a configuration modification causing a first member to be moved from the first security group to the second security group;
      without implementing the proposed modification and without modifying the first set of firewall rules and the second set of firewall rules:
         based on the second set of firewall rules, identifying new logical associations between the first member and one or more members of the second set of members in the second security group; and
         displaying, on a display device, a representation of the SDN with the new logical associations;
      receiving input indicating whether to accept the proposed modification or to reject the proposed modification; and
      in response to determining that the input indicates that the proposed modification is to be accepted, implementing the proposed modification.

16. The software defined network manager of claim 15, wherein the one or more non-transitory computer-readable storage media store additional instructions which, when executed by the one or more processors, cause the one or more processors to perform:
      based on, at least in part, the first set of firewall rules and the second set of firewall rules, generating a graphical representation of the first plurality of logical associations and the second plurality of logical associations;
      displaying, on the display device, the graphical representation of the first plurality of entity logical associations and the second plurality of logical associations;
      wherein the graphical representation includes a plurality of graphical objects that corresponds to members included in the first plurality of logical associations and the second plurality of logical associations; and
      wherein the graphical representation includes a plurality of links that corresponds to the first plurality of logical associations and the second plurality of logical associations.

17. The software defined network manager of claim 16, wherein the one or more non-transitory computer-readable storage media store additional instructions which,
      based on the proposed modification and the second set of firewall rules, identifying logical associations that no longer exist between the first member and one or more members of the first set of members in the first security group; and
      displaying, on a display device, a representation of the SDN without the logical associations that no longer exist between the first member and one or more members of the first set of members in the first security group.

18. The software defined network manager of claim 16, wherein a overlay graphical representation of the first member and one or more members is displayed on the display device as an overlay over the graphical representation of the first plurality of logical associations and the second plurality of logical associations.

19. The software defined network manager of claim 15, wherein the first member is a virtual machine.

20. The software defined network manager of claim 15, wherein the one or more members of the second set of members are applications.

* * * * *